United States Patent [19]

Cutter

[11] 4,249,040
[45] Feb. 3, 1981

[54] TELEPHONE COMMUNICATION CONTROL SYSTEM

[76] Inventor: Albert F. Cutter, 1081 Apache St., North Brunswick, N.J. 08902

[21] Appl. No.: 79,979

[22] Filed: Sep. 28, 1979

[51] Int. Cl.³ .......................................... H04M 11/00
[52] U.S. Cl. .................................................. 179/2 A
[58] Field of Search ............................. 179/2 A, 2 E

[56] References Cited
U.S. PATENT DOCUMENTS 3,346,696  10/1967  Mann ................................. 179/2 A

*Primary Examiner*—Stuart N. Hecker
*Attorney, Agent, or Firm*—Arthur L. Plevy

[57] ABSTRACT

There is disclosed a control system particularly adapted for use on a construction site. The system provides a two wire telephone communication path implemented via a control unit. The control unit selectively operates controlled apparatus employed to perform a monitored task. If a dangerous situation arises, either user can inactivate the controlled apparatus by means of a button located on the telephone handset. If the communication lines are damaged or broken, operation of the controlled apparatus automatically ceases. The control unit enables the users to continue operation of the controlled apparatus after the situation has been corrected or the necessary repairs to the phone lines made.

10 Claims, 2 Drawing Figures

TELEPHONE COMMUNICATION CONTROL SYSTEM

BACKGROUND OF THE INVENTION

This invention relates to a telephone communication control system and more particularly to a control module adapted to supply operating power to a monitored unit while enabling either of the two users to communicate by means of a telephone connection, and to selectively disconnect the monitored unit.

Presently there is a need in many industrial uses for a two way communication system to enable a user at a first site to communicate with a user at a second site. This, of course, is a function of a telephone system in general. In such industrial uses as on a construction site, the users of the phone system oftentimes monitor the progress of a piece of apparatus in order to control its performance and to determine whether the task is progressing properly. The uses of the telephone on construction sites are many. For example, on many construction sites workers use apparatus which is designated as a wire puller and vacuum system. Such wire pullers are well known in the art and essentially enable construction workers to lay and direct cable in suitable conduits or trenches. In this manner, the wire puller is located at a central position. Wire or cable is fed from a feeding site and is directed to the wire puller from a huge reel or source of wire. At the other end of the wire puller, additional men are located to direct the wire with the aid of the puller through the various conduits to hence route the wire or cable as desired. In any event, as one can imagine, noise level on a construction site is extremely high. There also exists many sources of radio frequency interference due to the operation of heavy construction equipment which is conventionally employed on a construction site.

In present operations when a task such as wire pulling is performed, the construction workers use conventional communication systems such as field phones or radio transmitters and receivers to communicate between the cable feed site and the pulling station. The reason for this is that during the course of pulling the cable, many things can occur which will interrupt the pull. For example, the cable on the feed spool can be depleted and hence, the pulling site must be informed of this in order to stop the pull and to splice or insert additional cable. Cable can become jammed or cut and hence, the wire puller must be inactivated and the pull must be stopped to avoid injury. In the use of a telephone system, in many instances the wires between the pulling and feed sites may be inadvertently cut or damaged and hence, communication would be lost.

A wire puller, as indicated, is a conventional piece of equipment and many examples exist in the prior art. A particularly effective puller is manufactured by the Greenlee Tool Co. of Rockford, Illinois. These pullers provide large torque and hence, create great forces on the wire or cable. Accordingly, if the phone circuit should be disconnected or the cable jammed and the wire puller not stopped, the cable can be damaged or substantial injuries can occur to the construction workers. This has happened numerous times in the past and is a great source of difficulty for the construction worker and the contractor in general.

It will be understood that the problem described above in conjunction with the wire puller is also a problem in regard to the operation of other pieces of heavy equipment in heavy noise environments such as a construction site and where the progress of a particular job is monitored between two extreme sites.

It is therefore an object of the present invention to provide a control apparatus which supplies operating power to a machine and which system enables communication between a first and a second site to enable a user at either site to immediately disconnect power to the machine when a dangerous situation is detected.

BRIEF DESCRIPTION OF THE PREFERRED EMBODIMENT

A telephone communication control system for use in controlling the operation of apparatus by monitoring the progress of said apparatus between a first and a second site, comprising in combination a first series path including a first and second telephone handset arranged in a series circuit between said first and second sites to provide a talk/receive path therebetween, said series path including control means operative in a first mode to supply a first control signal when said series path is complete, and operative in a second mode to provide a second control signal when said series path is opened manifesting an interruption of said talk/receive path, means responsive to said first control signal for applying an operating level to said monitored apparatus to enable operation of the same, and responsive to said second control signal for disabling operation of said apparatus when said series path is opened, switching means associated with at least one of said handsets to enable a user to selectively open or close said series path.

DETAILED DESCRIPTION OF THE INVENTION

Figure 1:
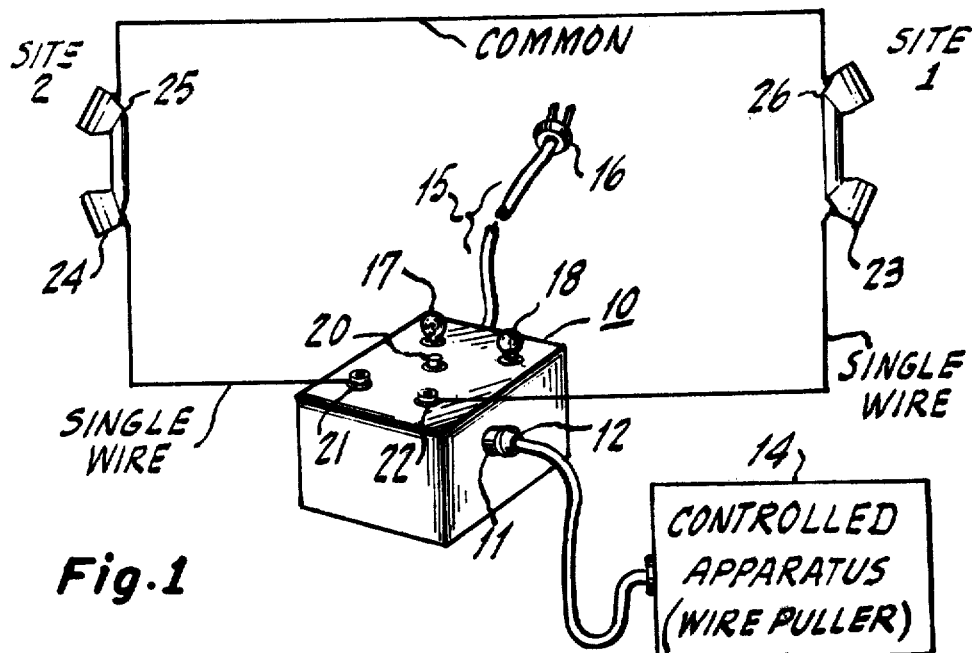
FIG. 1 is a block diagram of a telephone communication control system according to this invention.

Referring to FIG. 1, there is shown a control box or housing 10. Basically, the housing 10 may be extremely compact and as shown in FIG. 1, is rectangular in configuration but may assume any conventional shape. The housing 10 has a power outlet 11 on one surface thereof. The outlet 11 is a conventional female outlet and is adapted to receive a plug or male connector 12 for supplying AC power to a controlled apparatus 14. The apparatus 14 may be any suitable type of machinery which operates from an AC source or as will be explained, could be any type of machinery assisting in a construction or other operation and whose progress must be monitored between two sites. Essentially, the control box 10 is relatively simple in appearance and has a power cord 15 and a male connector 16 adapted to be inserted into a source of AC power or a power source in general.

Located on an appropriate surface of the control box 10 are two indicator lights designated as 17 and 18. As will be explained, a light such as 18 indicates operation of the unit 14, while the light as 17 indicates that the unit 14 has been disconnected. The lights 17 and 18 may be of different colors as is apparent to give an immediate indication to the user of system operation.

Also located on the control unit 10 is a reset button 20. The button or switch 20 enables the user to apply power to the unit 14 initially or whenever power has been interrupted due to the operation of the control circuit contained in unit 10.

Also shown located on the control unit are two terminals 21 and 22, each of which are coupled to a telephone handset as 23 and 24. The telephones enable a user at site 1 to communicate with a user at site 2 via the control unit 10.

In FIG. 1, there is shown a button located on each telephone unit as button 25 for unit 24 and button 26 for unit 23. As will be explained, a user upon activation of the button or switch 25 or 26, can immediately disconnect power from the controlled apparatus 14 and hence, can immediately cease operation of the same. It is, of course, understood that while FIG. 1 shows a button on each telephone handset, a single button at either site 1 or site 2 can be employed to thereby control operation of apparatus 14 according to the monitored conditions at one site. In any event, the use of switches as 25 and 26 at both sites gives greater utility to the apparatus.

Briefly the apparatus in FIG. 1 operates as follows:

When the control unit 10 is plugged into a suitable source of power, the outlet 11 is activated and a controlled apparatus such as 14 can be plugged into the control box to receive operating power. In the above instance, it is assumed that the reset button has been depressed which indicates that power is being supplied to the controlled apparatus 14 as further visualized by operation of light 18. During normal conditions, if progress is being made satisfactorily at both construction sites, operation of the controlled apparatus 14 continues and the users at sites 1 and 2 conventionally communicate via the telephone lines. If either user at site 1 or site 2 determines that a dangerous condition might arise or is occurring, he will activate the button 25 or 26 on his handset, which action immediately disconnects power to the controlled apparatus 14. When the controlled apparatus 14 is disabled, the light 17 comes on and light 18 is turned off. Hence, there is an immediate indication that operation has ceased. The users at both sites can still communicate during this condition and hence, discuss what has occurred and the reason for the action.

Once power has been interrupted as described above, one would have to access the control box 10 and press the reset button 20 to again assume operation of the system after the difficulty has been resolved. In this manner, there is a positive action required to again supply power to the controlled apparatus 14.

In the event that either wire from the control unit 10 to the handsets 23 or 24 is broken or disconnected and hence the communication channel between site 1 and site 2 is disabled, power is immediately removed from the controlled apparatus 14. In this instance, power will only be supplied to the controlled apparatus 14 when the damaged connection is repaired and only when communication is available between site 1 and site 2.

Hence, the system described assures that the users at site 1 and site 2 will have complete control of the operation of the apparatus 14 while having the ability to communicate with each other during the particular operation. If a dangerous situation arises, either user can terminate operation of the controlled apparatus or if the telephone lines are damaged, operation of the controlled apparatus automatically is terminated by the control unit.

Figure 2:
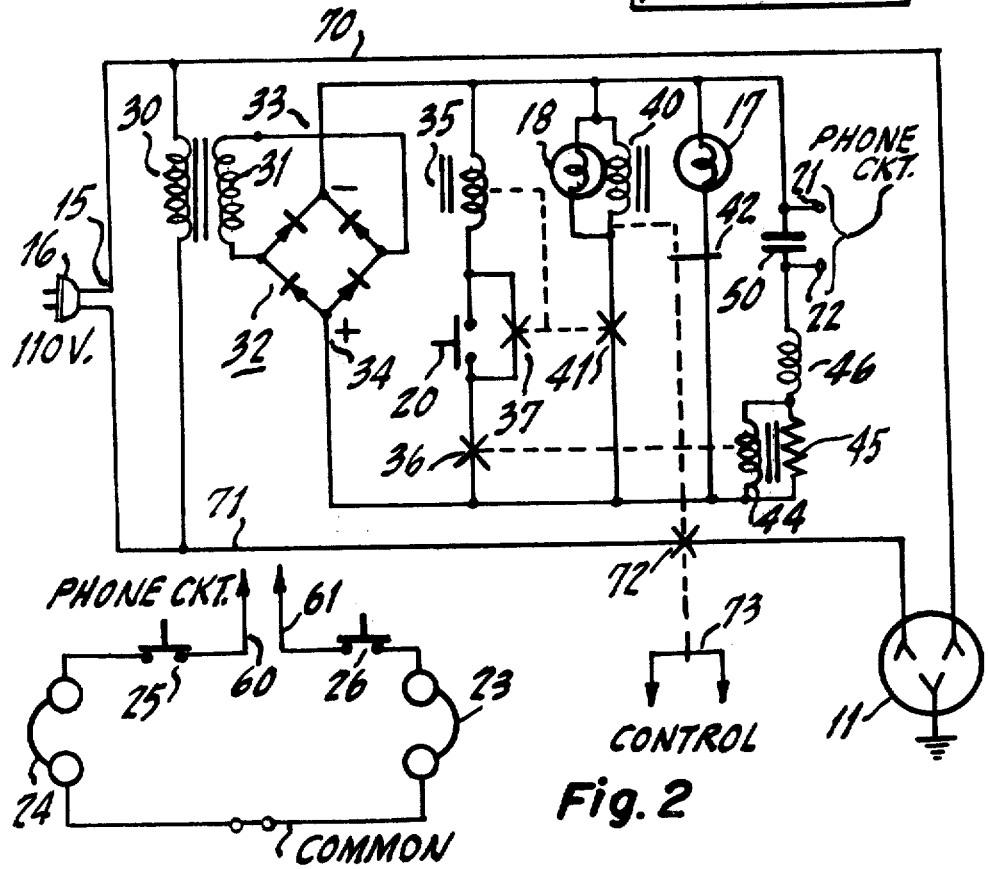
FIG. 2 is a schematic diagram of a control circuit employed in this invention.

Referring to FIG. 2, there is shown a schematic diagram of the control circuitry which will perform the above described functions and which circuitry is contained within the housing 10. For the sake of clarity, similar reference numerals have been employed to designate equivalent functioning components as indicated in FIG. 1.

As indicated above, the control unit is activated via a conventional source of AC power by plugging in connector 16 to the source. Coupled across the AC lines is a primary 30 of a power transformer. The secondary winding 31 is coupled to a suitable rectifier circuit 32. Circuit 32 is shown as a bridge rectifier and operates to convert the AC power to a suitable DC voltage as is well known in the art. In any event, if a center tapped secondary were employed, one could use a two diode rectifier in lieu of a bridge rectifier as is well known.

The output terminals 33 and 34 provide a low voltage DC which is used to bias the various components shown. Coupled across terminals 33 and 34 is a first circuit path consisting of a relay coil 35 in series with a momentary switch 20. Switch 20 is the reset switch shown in FIG. 1. In series with the switch is a nomally opened contact 36 which, as will be explained, is under the control of another relay coil. In order to clarify operation and as can be seen in FIG. 2, each relay coil is shown coupled to its control contacts by means of dashed lines. Also shown coupled across the reset switch 20 is a normally opened contact 37, which contact is energized by coil 35.

A second circuit path consists of another relay coil 40 in series with a normally opened contact 41, which contact is also activated or controlled by the operation of coil 35. In parallel with the coil 40 is indicator lamp 18. When lamp 18 is on, power is being supplied to connector 11 and hence, a suitable controlled apparatus which is plugged into connector 11 will receive operating power.

A third circuit consists of the lamp 17 in series with a normally closed contact 42 and arranged across terminals 33 and 34. Contact 42 is under control of the relay coil 40.

A fourth parallel leg comprises a relay coil 44, which coil controls contact 36. In parallel with the coil 44 is a current limiting resistor 45. In series with the parallel combination of coil 44 and resistor 45 is a filter inductor 46. One terminal of inductor 46 provides a phone handset connection point or terminal 22. The other terminal 21 for the other phone is connected to terminal 33. The terminals 21 and 22 are coupled together via a capacitor 50. Inductor 46 and capacitor 50 provide a suitable filter circuit to reduce hum or AC pickup in the telephone handset circuitry.

Shown below FIG. 2 are the telephone handsets 23 and 24 which are connected in a series circuit. Each handset, as indicated, has a normally closed momentary operated switch as 25 and 26 and as indicated in FIG. 1, each switch is located on the respective handset. The terminals 60 and 61 of the phone circuit are adapted to be coupled to terminals 21 and 22 of the control unit to thus complete the circuit.

It is noted that for the sake of convenience as well as to provide greater versatility, the handsets may be selectively coupled to the control unit via terminals 21 and 22 and may be easily removed therefrom when the unit is not in use. In this manner, the handsets can be used for other purposes in the field.

The use of handsets which include a telephone transmitter and receiver modules in a series path are well known in the communications field and essentially, the receivers and transmitters of the respective phones are arranged in a series circuit to enable a DC current to flow through the handsets and hence, provide a DC circuit path.

Referring to FIG. 2, it is seen that the AC power lines are directed to suitable terminals of connector 11. The first line 70 is coupled directly to a terminal of connector 11, while the second line 71 is coupled through a normally opened contact 72. Contact 72 is activated by relay coil 40 and hence, when contact 72 is closed, full operating power is applied to connector 11.

Located beneath contact 72 is a normally closed contact 73 which may also be controlled from coil 40 and as will be explained, enables dry circuit control or the turning off or turning on of a controlled apparatus by means of an open or short circuit. Such control techniques are available on many pieces of equipment such as 14 and hence, such equipment as 14 can be selectively operated by means of a dry circuit contact as 73.

Operation of the unit is a follows:

When the phone circuit is coupled to terminals 21 and 22, a DC current path exists through each handset and switches 25 and 26 to thereby activate relay coil 44 which receives its operating current through the above described DC path. Current therefore flows through both handsets 23 and 24 and communication between site 1 and site 2 is afforded. Thus, as seen, contact 36 is closed due to the operation of coil 44. Initially, lamp 17 is also activated via contact 42 which is a normally closed contact. At this instance, power is not supplied to connector 11 due to the fact that relay coil 40 is not operated and hence, contact 72 is opened. The controlled apparatus may now be set up and its power cable may be plugged into connector 11. When everything is adjusted properly, a user will depress the reset switch 20. Switch 20 is a momentary switch and activation of the same momentarily supplies power to coil 35 via contact 36 which is closed due to the operation of coil 44. Upon activation of switch 20, the coil 35 operates and then locks via contact 37 which closes to thus provide a holding path for coil 35 through contacts 37 and 36. Operation of the coil 35 closes contact 41 which then supplies operating power to coil 40 and the lamp 18. Operation of the coil 40 closes contact 72 to thus immediately supply power to the controlled apparatus 14 which begins operation. Upon activation of coil 40, contact 42 is also opened and hence, lamp 17 is turned off.

As can be seen, the above described operation assures that power is supplied to connector 11 and this is indicated by lamp 18. If a difficulty occurs on the job at either site, the user of either handset 23 or 24 will activate the momentary switch 25 or 26. The momentary activation of either switch removes DC current from coil 44. Coil 44 when deenergized, will cause contact 36 to open. Hence, coil 35 will also be deactivated. Upon deactivation of coil 35, contact 41 opens to thus deactivate coil 40. Deactivation of coil 40 causes contact 72 to open to thereby remove power from the controlled apparatus. Contact 42 is again closed to cause light 17 to come on. Power will not be supplied to the controlled apparatus again unless the reset button 20 is momentarily depressed again and this is done at the control unit and only after the situation has been investigated and corrected, if necessary.

One can immediately ascertain from the above description that if either telephone line such as 60 and 61 is cut, damaged or interrupted, power to the controlled apparatus is interrupted via the same sequence as above described. Thus, the control circuit described herein will afford the operation as discussed in conjunction with FIG. 1 and provide the extreme safety advantages to those who employ the system.

It is further understood that electromechanical components such as relays have been employed but one could utilize suitable semiconductors such as silicon controlled rectifiers and so on to perform analgous functions. The use of electromechanical devices such as relays does enable construction workers and persons not necessarily familiar with electronics to service the equipment as by replacing relays and so on in a relatively expeditious manner.

As can be seen from FIG. 2, the unit is extremely simple in construction and requires relatively few components and hence, can be manufactured and provided at an extremely economical cost while affording the above noted advantages regarding job safety.

As one can ascertain, a contact as 73 could also serve to operate additional apparatus as to turn the same on and off, which apparatus may have its own power source and hence, in this case there would be no requirement to plug the same into connector 11.

As described above, the user of such a control system in assisting a wire pulling operation is an extreme advantage as it is known in the construction field that many accidents have occurred due to the inability of construction workers to properly disconnect the wire puller in emergency situations. However, it is also understood that the control unit as depicted may have great utility in other applications such as in the installation of elevator systems, crane operation, or in any such situation where an operation is determined by progress made at two remote sites and under the control of a controlled apparatus such as 14. Short circuit protection, if desired, can also be implemented. For example, if one "shorted out" terminals 21 and 22, relay coil 44 would remain energized, the communication path would be lost as there is no bias supply for the phones 23 and 24. Hence, by positioning a Zener diode across a coil as 44 and a suitable resistance in series therewith, protection against a short can be implemented. As one can ascertain, when the telephone lines (i.e. 21 and 22) are shorted, there is no voltage drop across the handsets 24 and 23 and the current in the loop increases. By detecting the increased current, one could also deactivate the relays and thus the controlled equipment. Many techniques for providing short circuit protection are known and can be employed.

It will thus be apparent to those skilled in the art upon reading the above specification that many alternative uses as well as alternate configurations for such apparatus may be apparent and are deemed to be encompassed within the spirit and scope of the claims appended hereto.

I claim:

1. A telephone communication control system for use in controlling the operation of apparatus by monitoring the progress of said apparatus between a first and a second site, comprising in combination,
(a) a first series path including a first and second telephone handset arranged in a series circuit between said first and second sites to provide a talk/receive path therebetween, said series path including control means operative in a first mode to supply a first control signal when said series path is complete and operative in a second mode to provide a second control signal when said series path is opened manifesting an interruption of said talk-/receive path, (b) means responsive to said first control signal for applying an operating level to said monitored apparatus to enable operation of the same, and responsive to said second control signal for disabling operation of said apparatus when said series path is opened, (c) switching means associated with at least one of said handsets to enable a user to selectively open or close said series path.

2. The telephone communication control system according to claim 1 wherein said switching means comprises at least one normally closed switch located on one of said telephone handsets and arranged in said series circuit, whereby operation of said switch by a user opens said series circuit to cause said control means to provide said second control signal, whereby said operation of said apparatus is disabled.

3. The telephone communication control system according to claim 1 wherein said control means includes a relay coil in series with said series path and having a first normally opened contact indicative of said second control signal, said coil when energized due to said completed series path, operative to close said contact indicative of said first control signal.

4. A telephone communication control system for use in selectively supplying operating potential to a controlled apparatus by monitoring the progress of said apparatus between a first and a second control site, comprising in combination:

(a) a connector adapted to be coupled to a source of operating potential by means of a first and second path, (b) first and second telephone handsets arranged in a series circuit between said first and second sites to provide a receive/talk path therebetween, said series circuit including control means operative to provide a first control signal when said series circuit is complete and a second control signal when said series path is opened, (c) means coupled in series with one of said first and second paths and responsive to said first control signal to close said path to supply said operating potential to said connector in a first mode and responsive to said second control signal to open said path in a second mode indicative of said series path being opened and hence, to remove operating potential from said connector during said control signal, and (d) switching means associated with at least one of said handsets to enable a user to selectively open or close said series circuit, whereby said path is opened when said series circuit is opened due to the activation of said switching means or another opening of said series path.

5. The telephone communication control system according to claim 4 wherein said series circuit is adapted to be coupled to a source of biasing potential for supplying a current flow through said series path, with said control means responsive to said current flow to provide said first control signal during the presence of said current and to provide said second control signal during the absence of said current due to an opening of said series path.

6. The telephone communication control system according to claim 5 further including:

a momentary switch coupled to said means responsive to said control signal for operating said means in said first mode during the presence of said first control signal.

7. The telephone communication control system according to claim 4 further including:

first indicating means responsive to said first control signal to provide a first indication when operating potential is being supplied to said connector.

8. The telephone communication control system according to claim 4 further including:

second indicating means responsive to said control signal to provide a second indication when operating potential is removed from said connector.

9. A telephone communication control system for selectively supplying operating potential to a controlled apparatus by monitoring the progress of said apparatus at first and second remote sites, comprising in combination:

(a) an output connector adapted to be coupled to a source of operating potential by means of a first and second path and adapted to couple to said controlled apparatus for supplying operating potential thereto, (b) a series circuit including first and second telephone handsets each associated with one of said sites, said series circuit including control means arranged in said circuit and operative to energize when said circuit is complete indicative of an effective talk/receive path between said sites, (c) control switching means coupled in series with one of said output connector paths and operative to close said path in a first mode indicative of an effective talk/receive path and to open said in a second mode, (d) means coupled to said control switching means and responsive to said control means being operative to operate said switching means in said first mode to supply operating potential to said connector, to operate said control switching means in said second mode and to remove operating potential from said connector when said series circuit is opened, and (e) at least one normally closed switch in series with and located at one of said handsets to enable a user to selectively open said series circuit to thereby selectively remove operating potential from said connector.

10. The telephone communication control system according to claim 9 wherein said controlled apparatus is a wire puller apparatus adapted to be energized by an alternating source of potential.

* * * * *